United States Patent [19]

Lin

[11] Patent Number: 4,785,046

[45] Date of Patent: Nov. 15, 1988

[54] POLY(5-IMIDAZOLONE) AND PROCESS THEREFOR

[75] Inventor: Shiow C. Lin, Ellicott City, Md.

[73] Assignee: W. R. Grace & Co.-Conn., New York, N.Y.

[21] Appl. No.: 82,704

[22] Filed: Aug. 7, 1987

Related U.S. Application Data

[63] Continuation of Ser. No. 829,331, Feb. 14, 1986, Pat. No. 4,705,824.

[51] Int. Cl.$^4$ ............................................. C08G 73/06
[52] U.S. Cl. ..................................... 524/612; 528/210; 528/370; 528/397; 528/407; 528/423
[58] Field of Search ............... 528/370, 210, 423, 407, 528/397; 524/612

[56] References Cited

U.S. PATENT DOCUMENTS 4,529,793  7/1985  Abe et al. ............................ 528/210
4,705,824  11/1987  Lin ...................................... 528/370

FOREIGN PATENT DOCUMENTS 2433907  11/1982  Fed. Rep. of Germany .

OTHER PUBLICATIONS

Makromol. Chem. 177(6) 1687 (1976), G. Blinne, C. Cordes and H. Doerfel, "Azlactones", Organic Reactions, vol. III, John Wiley and Son, New York, N.Y., p. 198 (1949).
J. Am. Chem. Soc., 77, 1541 (1955), C. S. Cleaver and B. C. Pratt.

Primary Examiner—Harold D. Anderson
Attorney, Agent, or Firm—Howard J. Troffkin

[57] ABSTRACT

This invention relates to novel polymers, i.e., poly(5-imidazolones) and a process for preparing same from the reaction of a diazlactone with a primary diamine and thereafter dehydrating the resultant polyamide product. The polymers have good thermal properties and can be used as a composite matrix with a refinforcing agent such as fiber glass.

6 Claims, No Drawings

POLY(5-IMIDAZOLONE) AND PROCESS THEREFOR

This is a continuation of application Ser. No. 829,331, filed Feb. 14, 1986, now U.S. Pat. No. 4,705,824.

BACKGROUND OF THE INVENTION

This invention relates to novel polymers, i.e., poly(5-imidazolones) and a process for preparing same from the reaction of a diazlactone with a primary diamine and thereafter dehydrating the resultant polyamide product. The polymers have good thermal properties and can be used as a composite matrix with a reinforcing agent such as fiber glass.

PRIOR ART DESCRIPTION

Poly(2-imidazolones) having good heat resistance were prepared by polycondensation of diisocyanates with the reaction products of alpha-hydroxyketones and aromatic diamines according to the following equations:

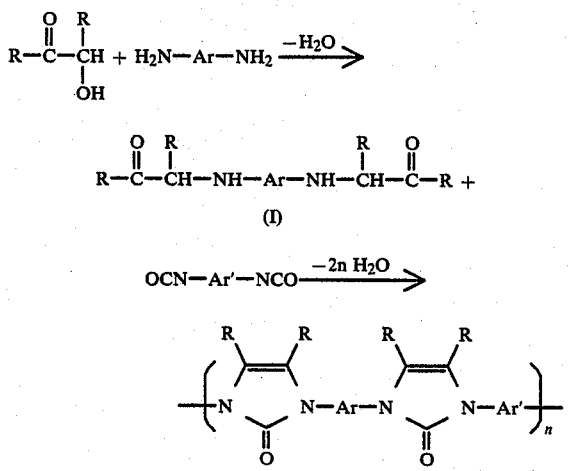

The polymers were reported to have good heat and thermal resistances. They could be used for the preparation of flexible films from solutions and parts by molding at 350° C. For instance, when

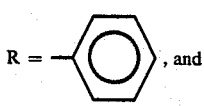, and

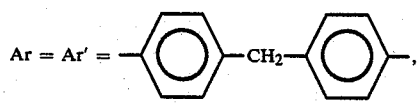, the polymer has a glass transition equal to 235° C. and a decomposition temperature at 375° C. See G. Blinne, German Offenlegungsschrift No. 2,433,907 (1976) and G. Blinne, C. Cordes and H. Doerfel, Makromol. Chem., 177(6), 1687 (1976).

Azlactones or 2-oxazolin-5-ones are prepared from the dehydration of N-acyl-alpha-amino acid:

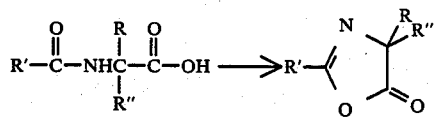

They react with primary amines and produce the corresponding diamides in very high yield:

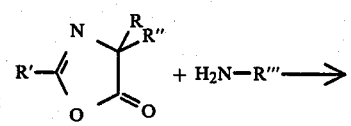

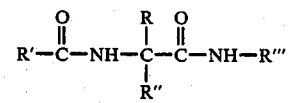

See H. E. Carter, "Azlactones" in "Organic Reactions", Vol. III, John Wiley and Son, New York, N.Y., page 198 (1949). Using this reaction, fiber forming polyamides were synthesized from 2,2'-bis-[5(4H)-oxazolones] and diamines. The polymerization conditions were quite mild for the preparation of high molecular weight polyamides. See C. S. Cleaver and B. C. Pratt, J. Am. Chem. Soc., 77, 1541 (1955).

The reaction between an azlactone and an amine was concluded to form an imidazolone (glyoxalone) as shown in equations:

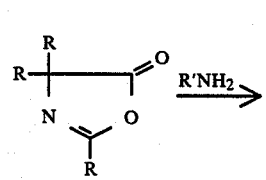

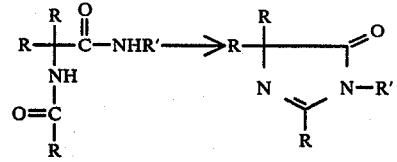

["Organic Reactions", Vol. IV, John Wiley and Son, New York, N.Y., 1949, Chapter 5, 1981].

When $R'=H$, the action of sodium hydroxide alone converts the amide into the imidazoline, when $R'=-CH_2R$, heating above the melting point is required.

Unsaturated azlactones react with amines to give amides of alpha-acylamino-acrylic acids which can be converted into imidazol-5-one derivatives as shown in the following equations when $R''=H$:

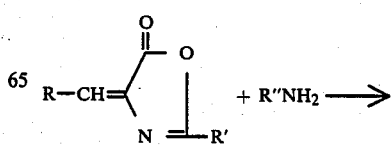

-continued

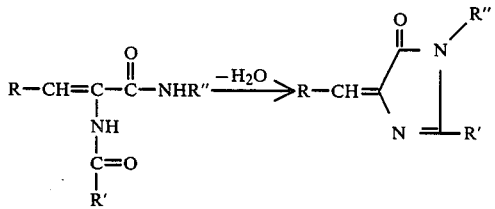

The action of sodium hydroxide alone converts the amide into imidazolone; when R''=—CH₂R, heating above the melting point is required. Substituted anilides (R''=C₆H₄R) have been converted into imidazol-5-one derivatives by the action of phosphorous oxycloride. See H. E. Carter, "Azlactones" in "Organic Reactions", Vol. III, John Wiley and Son, New York, N.Y., page 198 (1949).

OBJECTS OF THE INVENTION

One object of this invention concerns the preparation of new polymers, poly(5-imidazolones), from a diazlactone and a primary diamine.

Another object of the invention is to produce a process for preparing poly(5-imidazolones). Other objects will become apparent from a reading hereinafter.

DESCRIPTION OF THE INVENTION

This invention relates to novel polymers, i.e., poly(5-imidazolones) and a process for preparing same from the reaction of a diazlactone with a primary diamine and thereafter dehydrating the resultant polyamide product.

The polymers have good thermal properties and can be used as a composite material with fiber glass.

The polymerization can be simplified as shown in the following equations:

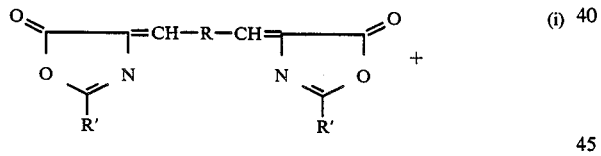

(i)

H₂N—R''—NH₂ ⟶

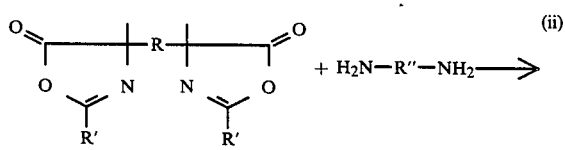

(I)

-continued

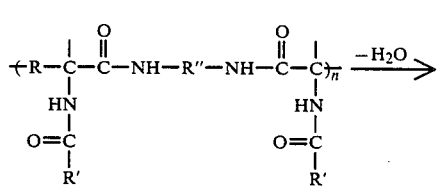

(II)

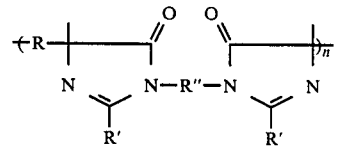

and

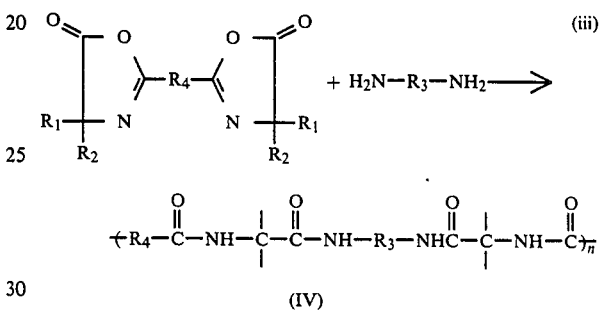

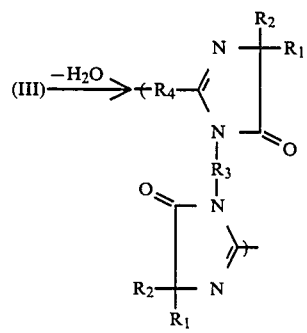

wherein R₁, R₂, R₃ and R₄ are each independent organic moieties.

In general, a diazlactone is reacted with a primary diamine to form apolyamide which, subsequently, is dehydrated to a poly(5-imidazolone).

Azlactones, 5-oxazolones, may be considered anhydrides of alpha-acylamino acids. Diazlactone has been synthesized by an Erlenmeyer condensation of dialdehyde with alpha-acylamino acide in the presence of sodium acetate and acetic anhydride, by the oxidative coupling of 2-phenyl-4-alkyl-5(4H)-oxazolones with mercuric acetate, and by the dehydration of N,N'-diacyl-bis-(alpha-amino acid) [C. S. Cleaver and B. C. Pratt, J. Am. Chem. Soc., 7, 1544 (1955)]. By condensation of 2,2'-diazlactones with diamines, the polymers made up of a regular arrangement of dicarboxylic acid, alpha-amino acid and diamine units, were prepared [W. E. Hanford, U.S. Pat. No. 2,293,388 (1942); C. S. Cleaver and B. C. Pratt, 77, 1541 (1955)].

Diazlactones operable herein to form poly(5-imidazolones) include, but are not limited to, 4,4'-bis-[5(4H)-oxazolone] (saturated); 4,4'-bis-[5(4H)-oxazolone] (unsaturated); 2,2'-bis[5(4H)-oxazolone] (saturated) and 2,2'-bis[5(4H)-oxazolone] (unsaturated) such as 2,2'-p-phenylenebis-[4-methyl-5(4H)-oxazolone]; 2,2'-p-phenylenebis-[4-isobutyl-5(4H)-oxazolone]; 2,2'-p-phenylenebis-[4,4-dimethyl-5(4H)-oxazolone]; 2,2'-p-phenylenebis-[5(4H)-oxazolone]; 2,2'-tetramethylenebis-[4,4-dimethyl-5(4H)-oxazolone]; 2,2'-dimethylenebis-[4,4-dimethyl-5(4H)-oxazolone]; 2,2'-tetramethylenebis-(spiro-[cyclohexane-1,4'-oxazol]-5'(4'H)-one) and the like.

Any primary diamine is operable as a reactant to form a poly(5-imidazolone) by the practice of the instant invention including aliphatic straight chain such as 1,5-diaminopentane, aliphatic branched chain such as 2-methyl 1,5-diaminohexane, aromatic such as p-diaminobenzene, arylalkyl such as 1,4-bis(2-amino ethyl)benzene, alkylaryl such as 2-ethyl 1,4-diaminobenzene, and cycloaliphatic such as 1,4-diaminocyclohexane. These primary diamines can be saturated or unsaturated, e.g., 1,4-diamino-2-butene. Additional commercially available primary diamines operable as reactants in the instant invention include, but are not limited to, ethylenediamine, propylenediamine, 1,3-diaminopropane, menthanediamine, hexamethylenediamine, tetramethylenediamine, 3-methyl hexamethylenediamine, 2,5-dimethyl hexamethylenediamine, octamethylenediamine, gamma, gamma'-diaminodipropyl ether, N,N'-dimetjyl hexamethylenediamine, m-phenylenediamine, isophoronediamine, 1,4-butanediamine and 1,5-pentanediamine.

The process for forming poly(5-imidazolones) is a two-step process at least the first step of which is preferably carried out in the presence of an organic solvent for the reactants. The reaction can be performed in the absence of a solvent, but preferably a solvent is employed. Various solvents are operable and include, but are not limited to, dimethylformamide (DMF), dimethylacetamide, N-methyl pyrrolidone (NMP) and the like.

The first step in the reaction, i.e., the polyamide formation, is carried out at a temperature in the range of about 30°-200° C., preferably 50°-80° C. The second dehydrating step is carried out at a temperature above 140° C., preferably 140°-300° C. If desired, prior to dehydrating the polyamide, the organic solvent, if present, can be removed by precipitating the polymer in a non-solvent such as acetone from which the polyamide can be recovered by filtration.

To maximize the molecular weight of the resulting polymer, the diazlactone and primary diamine are added in stoichiometric amounts for the amine group on the primary amine to react with the azlactone group on the diazlactone. Thus, the mole ratio of the diazlactone to the primary diamine is 1:1 for maximum molecular weight of the resulting polymer. However, the mole ratio of the reactants can vary over a broad range, e.g., 10:1 to 1:10, when lower molecular weight polymer is desired in accord with well known polymerization principles.

The composites formed from the poly(5-imidazolones) usually contain 1 to 70 volume % of the glass fiber or other reinforcing agent with the balance being the polymer.

The following examples will help to explain, but expressly not limit, the instant invention. Unless otherwise notes, all parts and percentages are by weight:

EXAMPLE 1

Synthesis of Unsaturated 4,4'-Bis-[5(4H)-oxazolone)

A mixture of 0.22 mole of acetylglycine, 0.10 mole of anhydrous sodium acetate, 0.10 mole of terephthalaldehyde and 0.5 mole of acetic anhydride was stirred and warmed up to boil in 20 minutes. The solution was refluxed for an hour, cooled and placed in a refrigerator overnight. During the reaction, the solution turned to yellow, orange and finally brick color. A brick color precipitate started to form after refluxing for about 10 minutes. The reaction mixture was treated with 500 ml of cold water containing cracked ice. The solid precipitate was filtered, washed three times with cold water and dried in a vacuum desiccator to obtain a powder product. The IR spectrum of this product showed strong absorptions at 1795 cm$^{-1}$ and 1770 cm$^{-1}$ indicating the formation of azlactone.

EXAMPLE 2

Preparation of Poly(5-imidazolone) from a Diazlactone from Example 1 and p-Aminophenyl Ether A mixture of 0.01 mole of a diazlactone from Example 1 and 0.01 mole of p-aminophenyl ether in 45 ml of N,N-dimethyl formamide (DMF) was stirred at 70° C. for 5 hours to give a dark brown color solution. The polymer precipitated by adding this solution to acetone, showed the disappearance of azlactone absorptions at 1,795 cm$^{-1}$ and 1,770 cm$^{-1}$ and the generation of a broad overlapped absorption at 1,650 cm$^{-1}$ (amide groups) in IR spectrum. The polymerization mixture was then heated to a temperature above 150° C. and water formed in dehydration was removed by toluene azeotrope. The final solution was added to 500 ml of acetone. The resulting powder was filtered and dried in a vacuum oven at 150° C. The IR spectrum of this powder showed two absorptions at 1,715 cm$^{-1}$ and 1,640 cm$^{-1}$ indicating the formation of imidazolone. The polymer solution in DMF was cast into a flexible dark brown film. The polymer had a decomposition temperature at 385° C. and a char yield of 48% at 700° C. in a nitrogen atmosphere.

EXAMPLE 3

Synthesis of Poly(5-imidazolone)

A mixture of 0.01 moles of the unsaturated azlactone monomer from Example 1 and 0.01 moles of p-aminophenyl ether in 45 ml of N-methyl pyrrolidone (NMP) was stirred at 70° C. for 5 hours to give a dark brown solution. Part of the polymer solution was added slowly into acetone to precipitate a polyamide. This polyamide was an orange powder and soluble in solvent such as NMP, N,N-dimethylformamide or N,N-dimethylacetamide. After heating at 170° C. for 16 hours in an air circulated oven, this polymer powder turns to a brown powder. The rest of the polyamide solution was heating up to 150° C. Toluene was added to the hot polymer solution and to maintain a reflux at this temperature. Water generated from dehydration was removed by azeotrope. After 2 hours, a black coagulated polymer having recurring structural units of the formula:

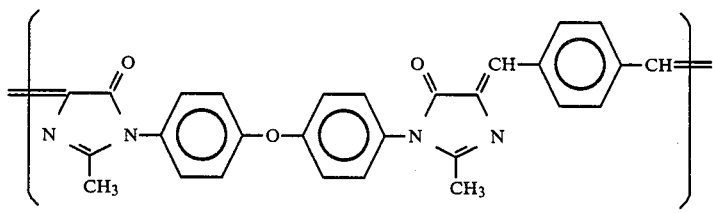

was precipitated because of the change of solubility in the solvent.

EXAMPLE 4

A portion of the polyamide solution from Example 3 was poured into a dish and dried in an oven at 150° C. for 16 hours. A black, fairly flexible film was obtained.

EXAMPLE 5

A portion of the polyamide solution from Example 3 was absorbed by a glass fiber fabric and dried at 120° C. to firm a prepreg. This prepreg was cut to equal size pieces and laminated. After heating at 200° C. under 500 psi. of pressure, a solvent resistant composite was formed. The composite has a brown color and has some flexibility.

I claim:

1. A poly(5-imidazolone) having recurring structural units selected from the formula group consisting of:

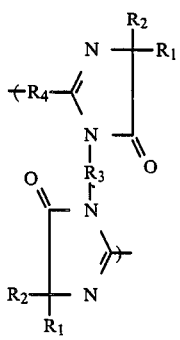

wherein $R_1$, $R_2$, $R_3$ and $R_4$ are each independent organic moieties.

2. A composition comprising 1 to 70 percent by volume of reinforcing agent with the balance being a poly(5-imidazolone) having recurring structural units selected from the formula group consisting of

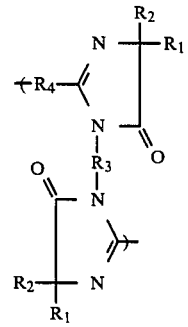

wherein $R_1$, $R_2$, $R_3$ and $R_4$ are each independent organic moieties.

3. The composition of claim 2 wherein the reinforcing agent is fiber glass.

4. A process of forming a poly(5-imidazolone) which comprises reacting an azlactone from the formula group consisting of

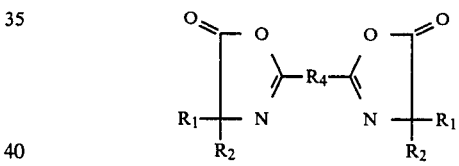

wherein $R_1$, $R_2$ and $R_4$ are independent organic moieties with a primary diamine at a temperature in the range of about 30°–200° C. to form a polyamide and thereafter dehydrating the thus formed polyamide at a temperature in the range 140°–300° C. to form the poly(5-imidazolone).

5. The process of claim 4 wherein the reaction to form the polyamide is carried out in an organic solvent for the reactants.

6. The process of claim 4 wherein the reaction to form the polyamide is carried out at a temperature in the range 50°–80° C.

* * * * *